US012670302B2

(12) United States Patent (10) Patent No.: US 12,670,302 B2

Liu et al. (45) Date of Patent: Jun. 30, 2026

(54) METHOD AND APPARATUS FOR OPTIMIZING LITHOGRAPHY QUALITY, ELECTRONIC DEVICE, MEDIUM AND PROGRAM PRODUCT

(71) Applicant: Institute of Microelectronics, Chinese Academy of Sciences, Beijing (CN)

(72) Inventors: Lihong Liu, Beijing (CN); Yayi Wei, Beijing (CN); Huwen Ding, Beijing (CN)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 655 days.

(21) Appl. No.: 18/255,045

(22) PCT Filed: Nov. 1, 2021

(86) PCT No.: PCT/CN2021/127864

§ 371 (c)(1),
(2) Date: May 30, 2023

(87) PCT Pub. No.: WO2023/070651

PCT Pub. Date: May 4, 2023

(65) Prior Publication Data

US 2024/0005064 A1 Jan. 4, 2024

(51) Int. Cl.
*G06F 30/23* (2020.01)
*G03F 7/00* (2006.01)
(Continued)

(52) U.S. Cl.
CPC .......... *G06F 30/23* (2020.01); *G03F 7/70433* (2013.01); *G06F 17/16* (2013.01); *G06F 2111/14* (2020.01)

(58) Field of Classification Search
CPC .......... G06F 30/20; G06F 30/23; G06F 30/33; G06F 30/3308; G06F 30/367;
(Continued)

(56) References Cited

U.S. PATENT DOCUMENTS

2005/0149902 A1* 7/2005 Shi .......................... G03F 7/705
716/52
2012/0052418 A1 3/2012 Tian et al.
(Continued)

FOREIGN PATENT DOCUMENTS

CN 1560657 A 1/2005
CN 103926707 A 7/2014
(Continued)

OTHER PUBLICATIONS

Zhang, Wei "Principle and Methodological Investigation on the Resolution Enhancement of Proximity Plasmonic Lens Lithography" China Doctoral Dissertations Full-text Database, Basic Sciences), No. 08, Aug. 15, 2016 (Aug. 15, 2016), pp. 1-19, 28-52, and 74-77 (117 pages).
(Continued)

*Primary Examiner* — Paul Dinh
(74) *Attorney, Agent, or Firm* — Osha Bergman Watanabe & Burton LLP

(57) ABSTRACT

Provided is a method for optimizing a lithography quality, including: determining a wave function stray term introduced by a surface roughness of a metal film layer based on Eigen matrix method and Bloch theorem; inputting the wave function stray term into a lithography quality deviation mathematical model for calculation and simulation to obtain an influence analysis curve of a roughness of the metal film layer on a lithography quality, the influence analysis curve characterizes an influence result of the roughness of the metal film layer on the lithography quality; reducing the
(Continued)

surface roughness of the metal film layer and/or providing a metal-dielectric multilayer film structure between a mask above a metal-dielectric unit and air according to the influence result, so as to optimize the lithography quality of the metal-dielectric unit. Provided is an apparatus for optimizing a lithography quality, an electronic device, a computer-readable storage medium and computer program product.

14 Claims, 15 Drawing Sheets

(51) Int. Cl.
*G06F 17/16* (2006.01)
*G06F 111/14* (2020.01)

(58) Field of Classification Search
CPC .. G06F 17/16; G06F 2111/14; G03F 7/70433; G03F 7/20; G03F 7/705; G03F 1/36
USPC .......................................................... 716/52
See application file for complete search history.

(56) References Cited

U.S. PATENT DOCUMENTS

| | | | |
|---|---|---|---|
| 2014/0282291 A1 | 9/2014 | Inoue et al. |
| 2018/0129765 A1 | 5/2018 | Stokbro et al. |
| 2019/0212274 A1 | 7/2019 | Zerrad et al. |
| 2020/0410656 A1 | 12/2020 | Moebert et al. |

FOREIGN PATENT DOCUMENTS

| | | |
|---|---|---|
| CN | 106325005 A | 1/2017 |
| CN | 109283796 A | 1/2019 |
| CN | 109669323 A | 4/2019 |

OTHER PUBLICATIONS

International Search Report issued in International Application No. PCT/CN2021/127864 dated Jul. 27, 2022 (3 pages).
Written Opinion issued in International Application No. PCT/CN2021/127864 dated Jul. 27, 2022 (4 pages).
Office Action issued in Chinese Application No. 202111285528.4, mailed on Jun. 20, 2025 (10 pages).

* cited by examiner

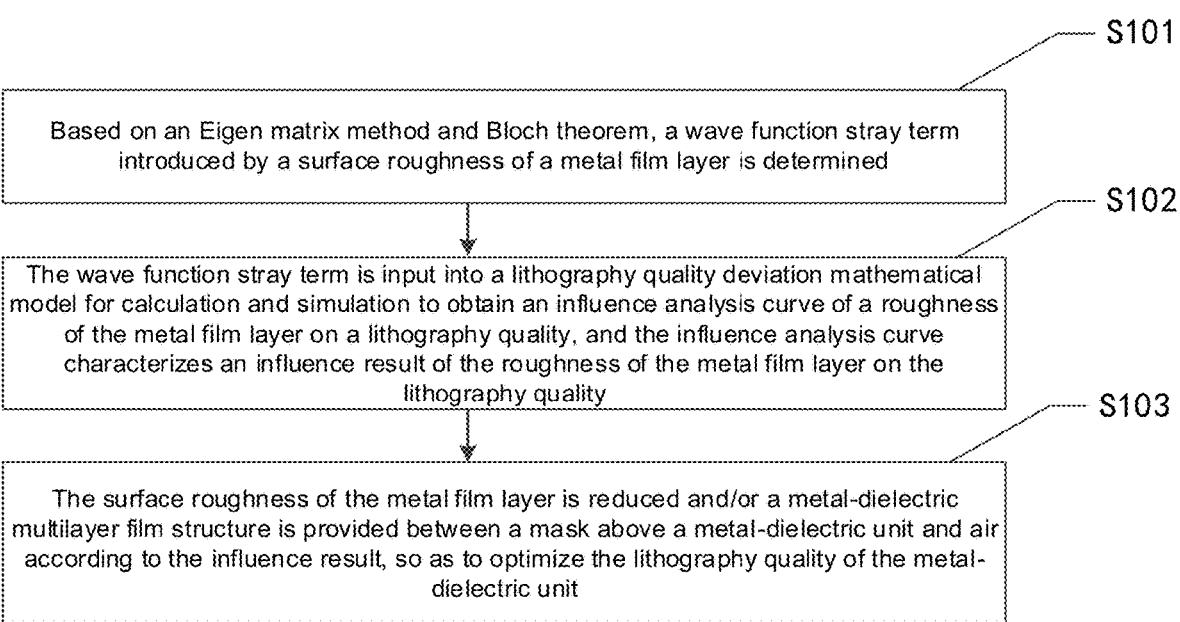

S101

Based on an Eigen matrix method and Bloch theorem, a wave function stray term introduced by a surface roughness of a metal film layer is determined

S102

The wave function stray term is input into a lithography quality deviation mathematical model for calculation and simulation to obtain an influence analysis curve of a roughness of the metal film layer on a lithography quality, and the influence analysis curve characterizes an influence result of the roughness of the metal film layer on the lithography quality

S103

The surface roughness of the metal film layer is reduced and/or a metal-dielectric multilayer film structure is provided between a mask above a metal-dielectric unit and air according to the influence result, so as to optimize the lithography quality of the metal-dielectric unit

FIG. 1

METHOD AND APPARATUS FOR OPTIMIZING LITHOGRAPHY QUALITY, ELECTRONIC DEVICE, MEDIUM AND PROGRAM PRODUCT

CROSS-REFERENCE TO RELATED APPLICATION

This application is a Section 371 National Stage Application of International Application No. PCT/CN2021/127864, filed on Jan. 1, 2021, entitled "METHOD AND APPARATUS FOR OPTIMIZING LITHOGRAPHY QUALITY, ELECTRONIC DEVICE, MEDIUM AND PROGRAM PRODUCT", the content of which is hereby incorporated by reference in its entirety.

TECHNICAL FIELD

The present disclosure relates to a technical field of nanolithography and optical metrology, and in particular, to a method and apparatus for optimizing a lithography quality, a medium and a program product.

BACKGROUND

Surface plasmons propagate in a form of evanescent wave bound on a metal-dielectric interface. An evanescent wave has a characteristic of exponential attenuation. The evanescent wave is coupled, amplified, transmitted, converged and imaged in a form of a periodic distribution of a metal-dielectric unit. Therefore, a surface plasmon-based nano-lithography technology exposes and images a pattern on a mask in a photoresist through the periodic distribution of the metal dielectric unit. Reliability and stability of a nano-lithography process depend on a contrast and an intensity of a photoresist spatial image. Therefore, a surface roughness of a metal film layer has an important influence on a quality of nanolithography.

SUMMARY

In order to solve problems existing in the prior art, a method and apparatus for optimizing a lithography quality, an electronic device, a medium and a program product provided by embodiments of the present disclosure analyzes an influence of the roughness of the metal film layer on the lithography quality so as to optimize the lithography quality of the metal-dielectric unit.

A first aspect of the present disclosure provides a method for optimizing a lithography quality, including: determining a wave function stray term introduced by a surface roughness of a metal film layer based on an Eigen matrix method and Bloch theorem; inputting the wave function stray term into a lithography quality deviation mathematical model for calculation and simulation to obtain an influence analysis curve of a roughness of the metal film layer on a lithography quality, wherein the influence analysis curve characterizes an influence result of the roughness of the metal film layer on the lithography quality; and reducing the surface roughness of the metal film layer and/or providing a metal-dielectric multilayer film structure between a mask above a metal-dielectric unit and air according to the influence result, so as to optimize the lithography quality of the metal-dielectric unit.

Further, the determining a wave function stray term introduced by a surface roughness of a metal film layer based on an Eigen matrix method and Bloch theorem includes: obtaining an Eigen matrix of a monolayer film in the metal-dielectric unit according to the Eigen matrix method; obtaining an unit Eigen matrix of the metal-dielectric unit according to the Eigen matrix of the monolayer film; determining a variation term introduced by a film layer thickness caused by the roughness of the metal film layer based on the Bloch theorem and the unit Eigen matrix, so as to obtain the wave function stray term introduced by the surface roughness of the metal film layer.

Further, the Eigen matrix $M_n(k_x, t_n)$ of the monolayer film satisfies a relationship of:

$$M_n(k_x, t_n) = \begin{pmatrix} \cos k_{zn} t_n & -\dfrac{ik_0\varepsilon_n}{k_{zn}}\sin k_{zn} t_n \\ -\dfrac{ik_{zn}}{k_0\varepsilon_n}\sin k_{zn} t_n & \cos k_{zn} t_n \end{pmatrix}$$

where $k_x$ represents a wave vector of an evanescent wave along an x-axis, $t_n$ represents a layer thickness of the monolayer film, $k_{zn}$ represents a wave vector of an electromagnetic wave along a z-axis, $k_0$ represents a wave vector in a vacuum, $\varepsilon_0$ represents a dielectric constant of the vacuum, and $\varepsilon_n$ represents a dielectric constant of the monolayer film.

Further, the unit Eigen matrix $M_{unit}(k_x, t_n)$ of the metal-dielectric unit satisfies a relationship of:

$$M_{unit}(k_x, t_n) = \begin{pmatrix} \cos(k_{zm} t_n - k_{zd} t_n) & \dfrac{ik_0\varepsilon_m}{k_{zm}}\sin(k_{zd} t_n - k_{zm} t_n) \\ \dfrac{ik_{zm}}{k_0\varepsilon_m}\sin(k_{zd} t_n - k_{zm} t_n) & \cos(k_{zm} t_n - k_{zd} t_n) \end{pmatrix}$$

where $t_n=t_m=t_d$, $t_m$ represents a layer thickness of a metal layer, $t_d$ represents a layer thickness of a dielectric layer, $k_{zm}$ represents a wave vector of the electromagnetic wave along the z-axis in the metal layer, $k_{zd}$ represents a wave vector of the electromagnetic wave along the z-axis in the dielectric layer, and $\varepsilon_m$ represents a dielectric constant of the metal layer.

Further, the wave function stray term $\Delta\psi(z')$ introduced by the surface roughness of the metal film layer satisfies a relationship of:

$$\Delta\psi(z') = \exp(-ik_z(t_m + \Delta t + t_d))\psi(z)$$

where $k_z$ represents a wave vector of the evanescent wave along the z-axis, $\Delta\psi(z')$ represents a normalized wave function of a transverse magnetic wave in an x-z plane, $\Delta t$ represents a variation term introduced by the film layer thickness $t_m$ caused by the roughness of the metal film layer, $z'=z+t_m+t_d$, $z$ represents a coordinate of the electromagnetic wave, and $z'$ represents a coordinate of the electromagnetic wave passing through the metal-dielectric unit.

Further, the inputting the wave function stray term into a lithography quality deviation mathematical model for calculation and simulation to obtain an influence analysis curve of a roughness of the metal film layer on the lithography quality includes:

inputting the wave function stray term into the lithography quality deviation mathematical model for calculation and simulation to obtain an energy density distribution result of the metal-dielectric unit; and obtaining the influence analysis curve of the roughness of the metal film layer on the lithography quality according to the energy density distribution result.

Further, before the step of determining a wave function stray term introduced by a surface roughness of a metal film layer, the method further includes:

testing an upper surface morphology of the metal film layer by using an atomic force microscope;

testing a lower surface topography of the metal film layer by using a template stripping and flipping technology; and obtaining the surface roughness of the metal film layer according to the upper surface topography and the lower surface topography.

Further, the metal-dielectric unit is composed of at least one metal film layer, and a dielectric layer in the metal-dielectric unit is located between metal film layers.

Further, the metal film layer is composed of one or more materials selected from Ag, Al, and Au.

Further, the metal-dielectric multilayer film structure is an Ag—SiO$_2$ multilayer film structure.

A second aspect of the present disclosure provides an apparatus for optimizing a lithography quality, including: a wave function stray term determination module configured to determine a wave function stray term introduced by a surface roughness of a metal film layer based on an Eigen matrix method and Bloch theorem; a simulation module configured to input the wave function stray term into a lithography quality deviation mathematical model for calculation and simulation to obtain an influence analysis curve of a roughness of the metal film layer on the lithography quality, wherein the influence analysis curve characterizes an influence result of the roughness of the metal film layer on the lithography quality; and a lithography quality optimization module configured to reduce the surface roughness of the metal film layer and/or provide a metal-dielectric multilayer film structure between a mask above a metal-dielectric unit and air according to the influence result, so as to optimize the lithography quality of the metal-dielectric unit.

A third aspect of the present disclosure provides an electronic device, including: a memory, a processor, and a computer program stored in the memory and running on the processor, wherein the computer program, when executed by the processor, implements the method for optimizing a lithography quality provided in the first aspect of the present disclosure.

A fourth aspect of the present disclosure provides a computer-readable storage medium having a computer program stored thereon, wherein the computer program, when executed by a processor, implements the method for optimizing a lithography quality provided in the first aspect of the present disclosure.

A fifth aspect of the present disclosure provides a computer program product including a computer program, wherein the computer program, when executed by a processor, implements the method for optimizing a lithography quality provided in the first aspect of the present disclosure.

BRIEF DESCRIPTION OF THE DRAWINGS

The present disclosure and advantages thereof will be understood more completely with reference to the following description of the accompanying drawings.

FIG. 1 schematically shows a flowchart of a method for optimizing a lithography quality according to an embodiment of the present disclosure.

DETAILED DESCRIPTION OF EMBODIMENTS

Figure 2:
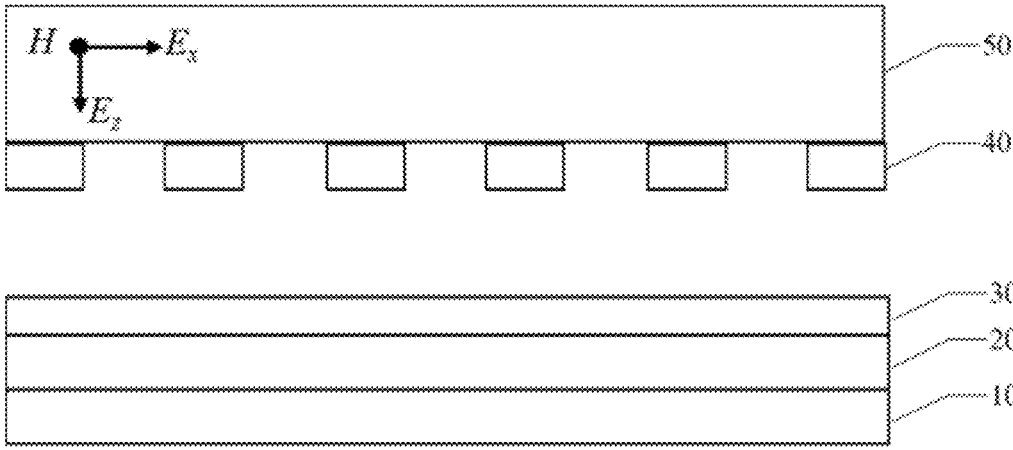
FIG. 2 schematically shows a schematic structural diagram of a metal-dielectric unit according to an embodiment of the present disclosure.

Embodiments of the present disclosure will be described below with reference to the accompanying drawings. It should be understood, however, that these descriptions are merely exemplary and are not intended to limit the scope of the present disclosure. In the following detailed description, for convenience of explanation, many specific details are set forth in order to provide a thorough understanding of the embodiments of the present disclosure. It will be apparent, however, that one or more embodiments may be implemented without these specific details. In addition, in the following description, descriptions of well-known structures and technologies are omitted so as to avoid unnecessarily obscuring the concepts of the present disclosure.

The terms used herein are for the purpose of describing specific embodiments only and are not intended to limit the present disclosure. The terms "including", "containing" and the like used herein indicate the presence of the features, steps, operations and/or components, but do not exclude the presence or addition of one or more other features, steps, operations or components.

All terms (including technical and scientific terms) used herein have meanings as commonly understood by those skilled in the art, unless otherwise defined. It should be noted that the terms used herein should be construed to have meanings consistent with the context of the specification and should not be construed in an idealized or overly rigid manner.

Where an expression similar to "at least one of A, B and C, etc." is used, the expression should be generally interpreted according to the meaning of the expression as commonly understood by those skilled in the art (for example, "a system having at least one of A, B, and C" shall include, but is not limited to, a system having A alone, B alone, C alone, A and B, A and C, B and C, and/or a system having A, B and C, etc.). Where an expression similar to "at least one of A, B, or C, etc." is used, the expression should be generally interpreted according to the meaning of the expression as commonly understood by those skilled in the art (for example, "a system having at least one of A, B or C" shall include, but is not limited to, a system having A alone, B alone, C alone, A and B, A and C, B and C, and/or a system having A, B and C, etc.).

Some block diagrams and/or flowcharts are illustrated in the accompanying drawings. It will be understood that some of the blocks in the block diagrams and/or flowcharts or a combination thereof may be implemented by computer program instructions. The computer program instructions may be provided to a processor of a general-purpose computer, a dedicated-purpose computer, or other programmable data processing apparatuses, so that the instructions, when executed by the processor, may create means for implementing the functions/operations illustrated in the block diagrams and/or flowcharts. The techniques of the present disclosure may be implemented in a form of hardware and/or software (including firmware, microcode, or the like). In addition, the techniques of the present disclosure may take the form of a computer program product on a computer-readable storage medium having instructions stored thereon, and the computer program product may be used by or in conjunction with an instruction execution system.

A roughness of film layer may be divided into a long-range roughness and a short-range roughness. The long-range roughness is caused by an average error in a film layer processing process, and the short-range roughness is caused by a random defect at a certain point in the film layer processing process. The present disclosure mainly aims at the long-range roughness RMS in the film layer processing process, and analyzes a deviation between a photoresist spatial image and an ideal image caused by an average surface-type error in the processing process. Surface plasmons are transmitted through a periodically arranged metal-dielectric unit. The surface roughness RMS of the metal film layer is distributed in a range of 0 to 2 nm. The influence of the roughness of the metal film layer on the lithography quality is not only manifested in a reduction of an imaging resolution, but also in a rapid attenuation of an electromagnetic field energy with an increase of the film layer roughness. In the specific implementation, the influence of the surface roughness of the metal film layer on an imaging quality in the photoresist is mainly analyzed based on the light intensity contrast.

FIG. 1 schematically shows a flowchart of a method for optimizing a lithography quality according to an embodiment of the present disclosure. As shown in FIG. 1, the method includes step S101 to step S103.

In operation S101, a wave function stray term introduced by a surface roughness of a metal film layer is determined based on an Eigen matrix method and Bloch theorem.

In operation S102, the wave function stray term is input into a lithography quality deviation mathematical model for calculation and simulation to obtain an influence analysis curve of a roughness of the metal film layer on the lithography quality, and the influence analysis curve characterizes an influence result of the roughness of the metal film layer on the lithography quality.

In operation S103, the surface roughness of the metal film layer is reduced and/or a metal-dielectric multilayer film structure is provided between a mask above a metal-dielectric unit and air according to the influence result, so as to optimize the lithography quality of the metal-dielectric unit.

An example flow of each step of the method for optimizing a lithography quality in this embodiment will be described in detail below.

In the embodiments of the present disclosure, before determining a wave function stray term introduced by a surface roughness of a metal film layer based on an Eigen matrix method and Bloch theorem, the method further includes: testing an upper surface morphology of the metal film layer by using an atomic force microscope; testing a lower surface topography of the metal film layer by using a template stripping and flipping technology; and obtaining the surface roughness of the metal film layer according to the upper surface topography and the lower surface topography.

Further, according to the obtained surface roughness of the metal film layer, the wave function stray term introduced by the surface roughness of the metal film is determined based on the Eigen matrix method and the Bloch theorem.

Specifically, the determining a wave function stray term introduced by a surface roughness of a metal film layer includes: obtaining an Eigen matrix of a monolayer film in the metal-dielectric unit according to the Eigen matrix method; obtaining an unit Eigen matrix of the metal-dielectric unit according to the Eigen matrix of the monolayer film; and determining a variation term introduced by a film layer thickness caused by the roughness of the metal film layer based on the Bloch theorem and the unit Eigen matrix, so as to obtain the wave function stray term introduced by the surface roughness of the metal film layer.

Based on the Eigen matrix method, the Eigen matrix $M_n(k_x, t_n)$ of the monolayer film having a thickness $t_n$ satisfies the following relationship:

$$M_n(k_x, t_n) = \begin{pmatrix} \cos k_{zn} t_n & -\dfrac{i k_0 \varepsilon_n}{k_{zn}} \sin k_{zn} t_n \\ -\dfrac{i k_{zn}}{k_0 \varepsilon_n} \sin k_{zn} t_n & \cos k_{zn} t_n \end{pmatrix}$$

where $k_x$ represents a wave vector of an evanescent wave along an x-axis, $t_n$ represents a layer thickness of the monolayer film, $k_{zn}$ represents a wave vector of an electromagnetic wave along a z-axis, $k_0$ represents a wave vector in a vacuum, $\varepsilon_0$ represents a dielectric constant of the vacuum, and $\varepsilon_n$ represents a dielectric constant of the monolayer film. The layer thickness of the monolayer film in the above formula refers to a thickness of the metal film layer or a thickness of the dielectric layer.

The evanescent wave meets a boundary continuity condition in a metal-dielectric periodically arranged multilayer film, that is, on an interface between a metal and a dielectric. The wave vector $k_x$ of the evanescent wave along the x-axis is invariant, that is, $k_x=k_{xd}=k_{xm}$, where $k_x d$ represents a wave vector of the electromagnetic wave along the x-axis in the dielectric layer, and $k_{xm}$ represents a wave vector of the electromagnetic wave along the x-axis in the metal film layer.

According to the Eigen matrix $M_n(k_x, t_n)$, the unit Eigen matrix Mont $(k_x, t)$ of the metal-dielectric unit may be obtained, which satisfies the following relationship:

$$M_{unit}(k_x, t_n) = M_m M_d$$

$$= \begin{pmatrix} m_{11} & m_{12} \\ m_{21} & m_{22} \end{pmatrix}$$

$$= \begin{pmatrix} \cos(k_{zm}t_n - k_{zd}t_n) & \dfrac{ik_0\varepsilon_m}{k_{zm}}\sin(k_{zd}t_n - k_{zm}t_n) \\ \dfrac{ik_{zm}}{k_0\varepsilon_m}\sin(k_{zd}t_n - k_{zm}t_n) & \cos(k_{zm}t_n - k_{zd}t_n) \end{pmatrix}$$

where $M_m$ and $M_d$ are respectively Eigen matrices of the metal layer and the dielectric layer, and $m_{11}$, $m_{12}$, $m_{13}$, and $m_{14}$ are respectively elements of the unit Eigen matrix $M_{unit}(k_x, t_n)$. $t_n=t_m=t_d$, $t_m$ represents a layer thickness of the metal layer, $t_d$ represents a layer thickness of the dielectric layer, $k_z m$ represents a wave vector of the electromagnetic wave along the z-axis in the metal layer, $k_{zd}$ represents a wave vector of the electromagnetic wave along the z-axis in the dielectric layer, $\varepsilon_m$ represents a dielectric constant of the metal layer, and Ed is a dielectric constant of the dielectric layer.

Combined with the Eigen matrix method and the Bloch theorem, the wave function $\psi(z)$ may be expressed in a periodic arrangement system as follows:

$$\psi(z') = \exp(-ik_z(t_m + t_d))\psi(z)$$

where the wave function $\psi(z)$ represents a normalized wave function of a transverse magnetic wave in an x-z plane, and electric fields thereof along the x-axis and the z-axis may be expressed as:

$$E_x(z) = -\frac{k_{zn}}{\omega\varepsilon_0\varepsilon_n}\exp(ik_{xn}x - ik_{zn}z)$$

$$E_z(z) = \frac{k_{xn}}{\omega\varepsilon_0\varepsilon_n}\exp(ik_{xn}x - ik_{zn}z)$$

where $k_{xn}$ and $k_{zn}$ represent wave vectors of the transverse magnetic wave along the x-axis and the z-axis; $\omega$ represents an angular frequency; a wave function after a metal-dielectric cycle is $\psi(z')$, where $z'=z+t_m+t_d$, z represents a coordinate of the electromagnetic wave, and z' represents a coordinates of the electromagnetic wave passing through the metal-dielectric unit.

The variation term $\Delta t$ introduced by the film layer thickness $t_m$ caused by the roughness of the metal film layer is determined to obtain the wave function stray term $\Delta\psi(z')$ introduced by the surface roughness of the metal film layer, which may be expressed as:

$$\Delta\psi(z') = \exp(-ik_z(t_m + \Delta t + t_d))\psi(z)$$

where $k_z$ represents a wave vector of the evanescent wave along the z-axis, $\psi(z)$ represents a normalized wave function of the transverse magnetic wave in the x-z plane, and $\Delta t$ represents a variation term introduced by the film layer thickness $t_m$ caused by the roughness of the metal film layer.

The surface roughness RMS is introduced into the thickness $t_m$ of the metal film layer, and a change of a vector ($k_x$, $k_z$) of the evanescent wave in a two-dimensional spatial distribution caused by a nanoscale fluctuation of the film layer thickness is analyzed based on the Eigen matrix method and the Bloch theorem. A real part of ($k_x$, $k_z$) causes a change in a phase of the electromagnetic field, which affects a resolution of a lithographic imaging; an imaginary part of ($k_x$, $k_z$) determines an attenuation of the electromagnetic field, which affects a size of a device and an effective depth of focus in the photoresist.

According to the embodiments of the present disclosure, the inputting the wave function stray term into a lithography quality deviation mathematical model for calculation and simulation to obtain an influence analysis curve of a roughness of the metal film layer on the lithography quality includes: inputting the wave function stray term into the lithography quality deviation mathematical model for calculation and simulation to obtain an energy density distribution result of the metal-dielectric unit; and obtaining the influence analysis curve of the roughness of the metal film layer on the lithography quality according to the energy density distribution result.

Specifically, the wave function stray term obtained in the step S101 is input into the lithography quality deviation mathematical model, which is a simulation model of the metal-dielectric unit. A simulation calculation is performed by an finite element analysis method to obtain an influence analysis curve of the roughness of the metal film layer on the lithography quality. The influence analysis curve characterizes an influence result of the roughness of the metal film layer on the lithography quality, which may measure the lithography quality through a lithography imaging contrast.

The surface roughness of the metal film layer or an imaging structure of the metal-dielectric unit may be further optimized according to the lithography imaging contrast, specifically; reducing the surface roughness of the metal film layer, and/or providing a metal-dielectric multilayer film structure between a mask above a metal-dielectric unit and air, so as to optimize the lithography quality of the metal-dielectric unit and reduce a line edge roughness of a photoresist pattern. The metal-dielectric multilayer film structure may be an Ag—SiO$_2$ multilayer film structure, etc.

In the embodiments of the present disclosure, the metal-dielectric unit is composed of at least one metal film layer, and a dielectric layer in the metal-dielectric unit is located between the metal film layers. For example, the metal-dielectric unit may be an imaging structure in a form of photoresist-silver composed of Ag—Pr, or a resonant cavity lens structure composed of Ag—Pr—Ag, etc., and a Pr layer is located on a surface of a Ag layer or between layer multiple layers of Ag layers. Specifically, the metal film layer may be composed of one or more of Ag, Al, and Au.

It should be noted that the metal film layer and the metal-dielectric multilayer film structure are not limited to the types described in the above-mentioned embodiments, and may be set according to actual application conditions, which is not limited in the embodiments of the present disclosure.

The optimization method provided by the present disclosure will be described in detail below with reference to specific embodiments. It should be understood that the structures and experimental results of the metal-dielectric unit shown in FIG. 2 to FIG. 13 are merely exemplary, in order to help those skilled in the art to understand the technical solution of the present disclosure, and are not intended to limit the scope of protection of the present disclosure.

Embodiment 1

As shown in FIG. 2, the metal-dielectric unit structure is an imaging structure in the form of photoresist-silver, which specifically includes: a silicon dioxide substrate 10, an Ag layer 20, a photoresist layer 30, a periodic chromium stripe layer 40 and a mask substrate 50. The mask substrate 50 is quartz, the Ag layer 20 and the photoresist layer 30 are sequentially located on the silicon dioxide substrate 10, and between the periodic chromium stripe layer 40 and the photoresist layer 30 is air.

As shown in FIG. 2, a wavelength of a monochromatic incident light source is 365 nm under an ideal condition. The transverse magnetic wave is incident, so a vibration direction of a magnetic field is downward perpendicular to an incident direction of the transverse magnetic wave. A dielectric constant of the mask substrate quartz is 2.25, and the mask is composed of the mask substrate 50 and six chromium (Cr) strips 40 with the air filled therebetween.

In this embodiment, a dielectric constant of a metal Cr is −8.55-8.96i, a thickness of the Cr strip is 40 nm, and a width of Cr, that is, a line width of the mask, is 120 nm. Between the mask and the photoresist, an air layer has a thickness of 15 nm. Along a positive z-axis direction of beam propagation, the electromagnetic wave reaches a photoresist layer after passing through the air layer. A thickness of the photoresist layer is 30 nm, and a dielectric constant of the photoresist is 2.59. A lower-layer Ag of the photoresist has a thickness of 50 nm and a dielectric constant of −2.4-0.24i. The substrate is silicon dioxide $SiO_2$, and there is no special requirement for a thickness of $SiO_2$. In this embodiment, the substrate $SiO_2$ has a thickness of 20 nm and a dielectric constant of 2.17. Among the above parameters, the thickness of the air layer has a great influence on the imaging quality of the photoresist spatial image. Due to the characteristic of the exponential attenuation of the evanescent wave, a spacing of the air layer is in a scale of tens of nanometers. Similarly, the lower-layer silver 20 of the photoresist mainly plays a role of enhancing a reflection of the electromagnetic field in the photoresist, so a thickness of the lower-layer silver has little influence on an electric field intensity, but a surface roughness of the lower-layer silver 20 has an important influence on the light intensity contrast.

Figure 3:
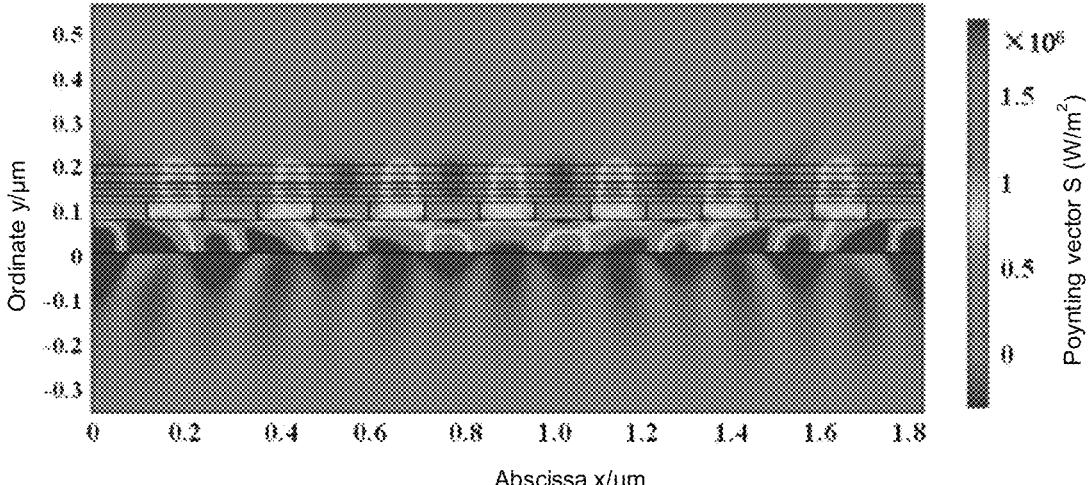
FIG. 3 schematically shows a schematic diagram of a Poynting vector distribution of the metal-dielectric unit as shown in FIG. 2.

A numerical simulation calculation is performed based on the finite element analysis method in combination with the wave function stray term introduced by the surface roughness of the metal film layer, so as to obtain a Poynting vector distribution in a two-dimensional plane, as shown in FIG. 3. The Poynting vector is a power flow distribution of the electromagnetic field in unit time, which is also known as a time-averaged power flow with a unit of $W/m^2$. Based on the Poynting vector, an energy distribution of the electromagnetic field in the photoresist, that is, the energy density distribution result of the metal-dielectric unit, may be obtained.

Figure 4:
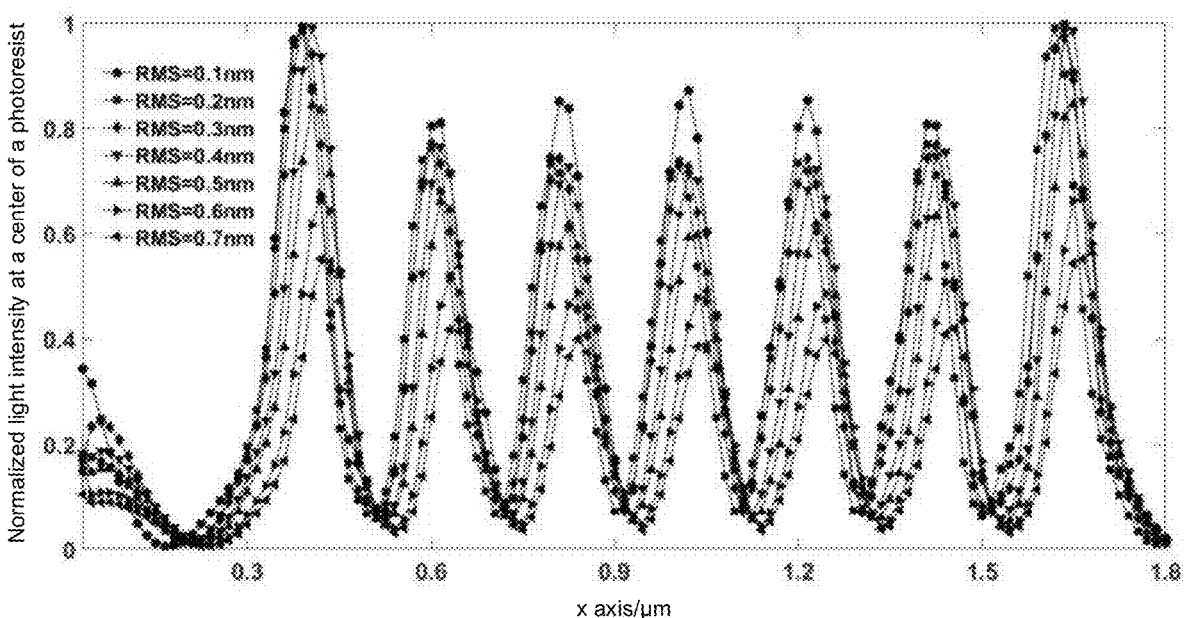
FIG. 4 schematically shows a schematic diagram of a normalized light intensity distribution at a center of a photoresist of the metal-dielectric unit as shown in FIG. 2.
Figure 5:
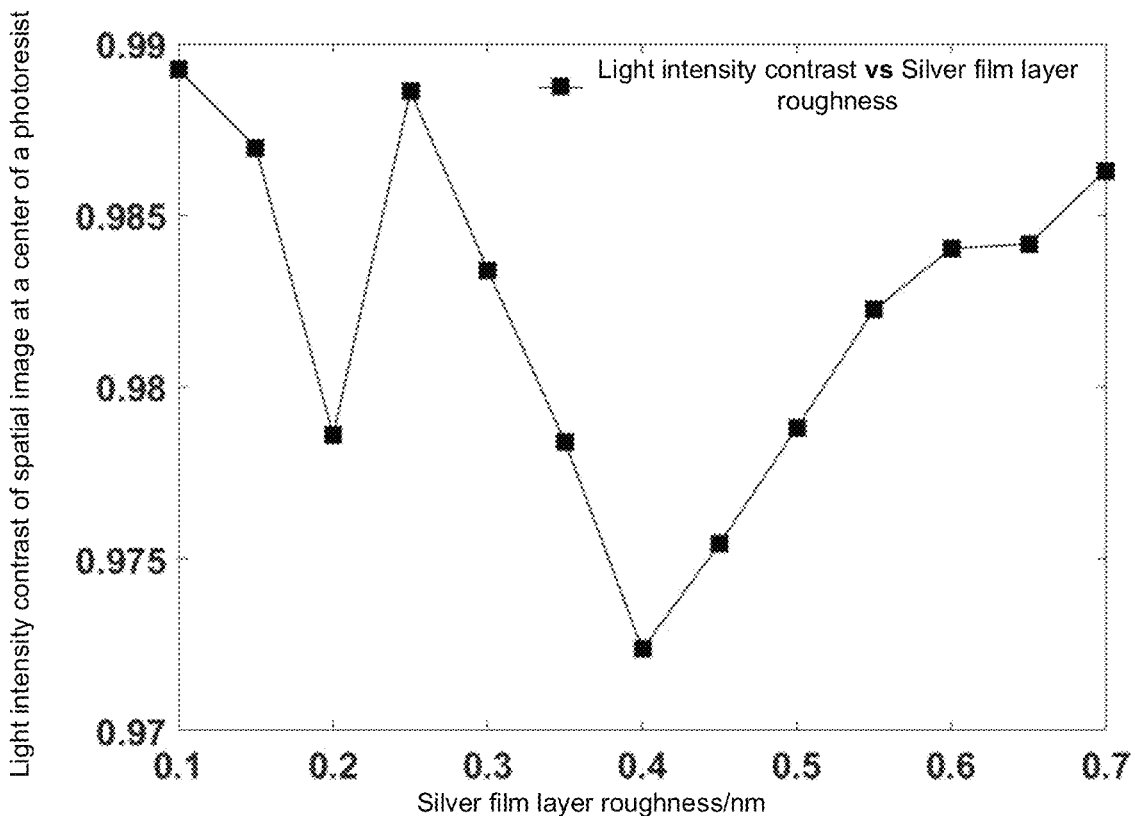
FIG. 5 schematically shows a schematic diagram of a curve between a light intensity contrast and a surface-type roughness of an Ag layer in a photoresist as shown in FIG. 2.

Based on the energy density distribution result of the metal-dielectric unit, a distribution map of a normalized light intensity at a center of the photoresist of the imaging structure in the form of photoresist-silver, as shown in FIG. 4, and an influence analysis curve of the roughness of the metal film layer on the lithography quality in the imaging structure in the form of photoresist-silver, as shown in FIG. 5, may be sequentially obtained.

As shown in FIG. 4, as the film layer roughness RMS increases from 0.1 nm to 0.7 nm, a light intensity gradually decreases. The smoother the film layer, the greater the light intensity at the center of the photoresist. With an increase of a film layer roughness of the lower-layer Ag, an electromagnetic wave energy is concentrated at an interface between the photoresist and the Ag layer, and a stray wave distributed at the interface caused by the film layer roughness has a greater proportion.

As shown in FIG. 5, the film layer roughness RMS increases from 0.1 nm to 0.4 nm, the light intensity contrast decreases from 0.989 to 0.972, and the contrast does not decrease significantly; the film layer roughness RMS increases from 0.4 nm to 0.7 nm, and the light intensity contrast increases from 0.972 to 0.986. For the imaging structure (Pr—Ag structure) in the form of photoresist-silver, the film layer roughness is in a range of 0.1 nm to 0.7 nm, the light intensity contrast is kept in a range of more than 0.97. The roughness of the lower-layer Ag of the photoresist has little influence on the imaging quality of the photoresist spatial image.

Embodiment 2

Figure 6:
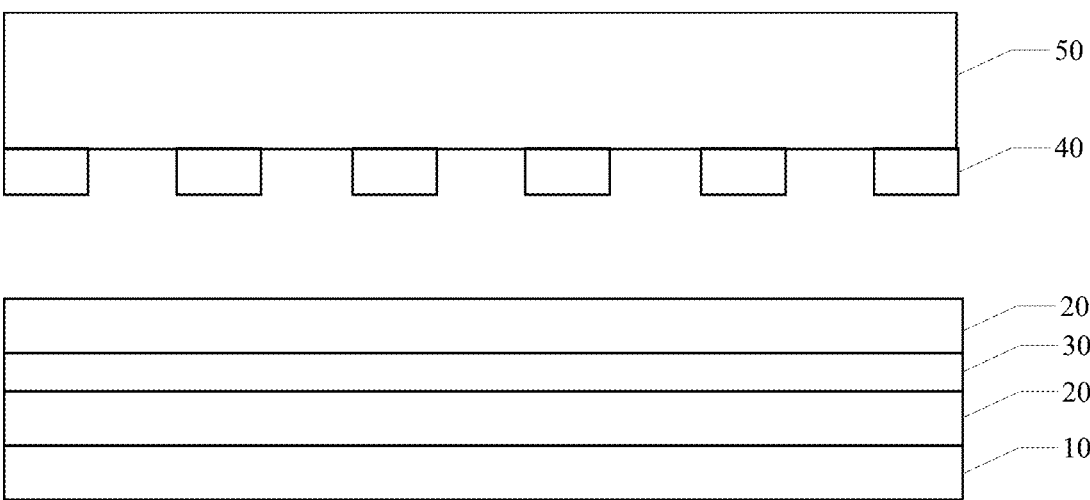
FIG. 6 schematically shows a schematic structural diagram of a metal-dielectric unit according to still another embodiment of the present disclosure.

A structure of the metal-dielectric unit in this embodiment is illustrated in FIG. 6. The difference between this embodiment and Embodiment 1 is as follow:

In this embodiment, the structure of the metal-dielectric unit is a resonant cavity lens, that is, a silver-photoresist-silver (Ag—Pr—Ag) structure, as shown in FIG. 6. An upper-layer silver 20 is arranged on the photoresist 30, and a layer thickness of the upper-layer silver 20 is 20 nm, and other parameters thereof are consistent with those in Embodiment 1.

Figure 7:
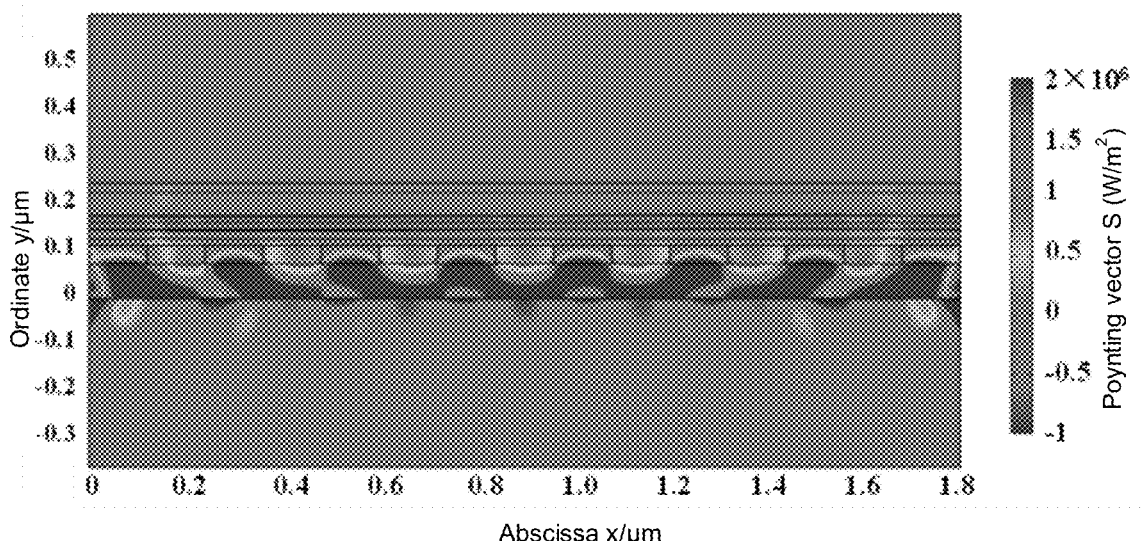
FIG. 7 schematically shows a schematic diagram of a Poynting vector distribution of the metal-dielectric unit as shown in FIG. 6.

Similarly, a numerical simulation calculation is performed based on the finite element analysis method in combination with the wave function stray term introduced by the surface roughness of the metal film layer, so as to obtain a Poynting vector distribution in a two-dimensional plane, as shown in FIG. 7. Compared with Embodiment 1, a resonant cavity imaging structure in a form of Ag—Pr—Ag in this embodiment may enhance a light intensity distribution in the photoresist.

Figure 8:
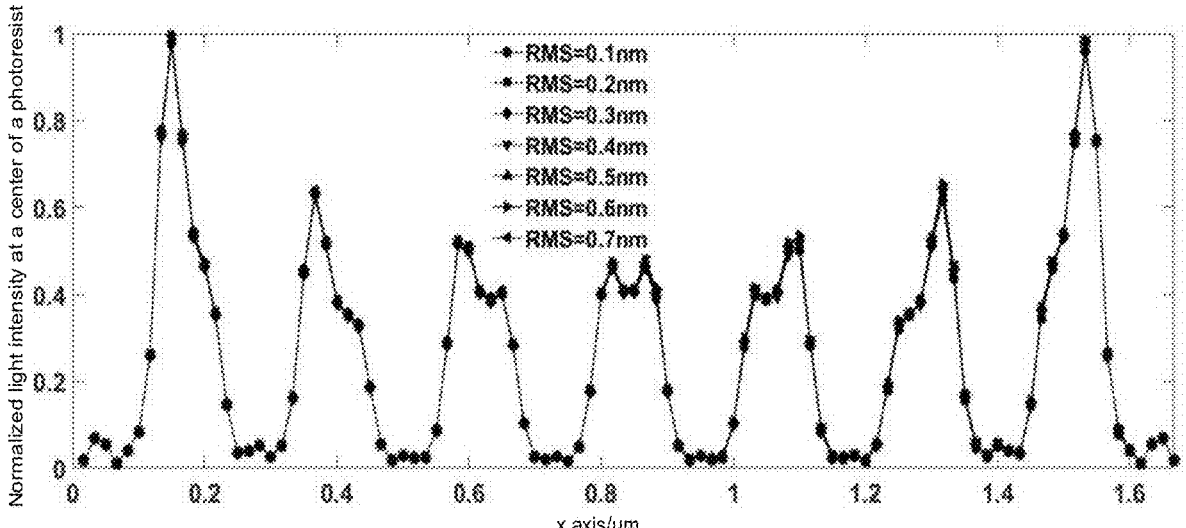
FIG. 8 schematically shows a schematic diagram of a normalized light intensity distribution at a center of a photoresist of the metal-dielectric unit as shown in FIG. 6.

FIG. 8 shows a schematic diagram of a normalized light intensity distribution at a center of a photoresist of the resonant cavity imaging structure. As shown in FIG. 8, for the resonant cavity imaging structure, an electric field mode at the center of the photoresist decreases to a certain extent, and the electric field and the light intensity distribution have a certain degree of resonance phenomenon. The roughness RMS of the Ag film layers above and below the photoresist increases from 0.1 nm to 0.7 nm, which has no obvious influence on the light intensity distribution at the center of the photoresist.

Figure 9:
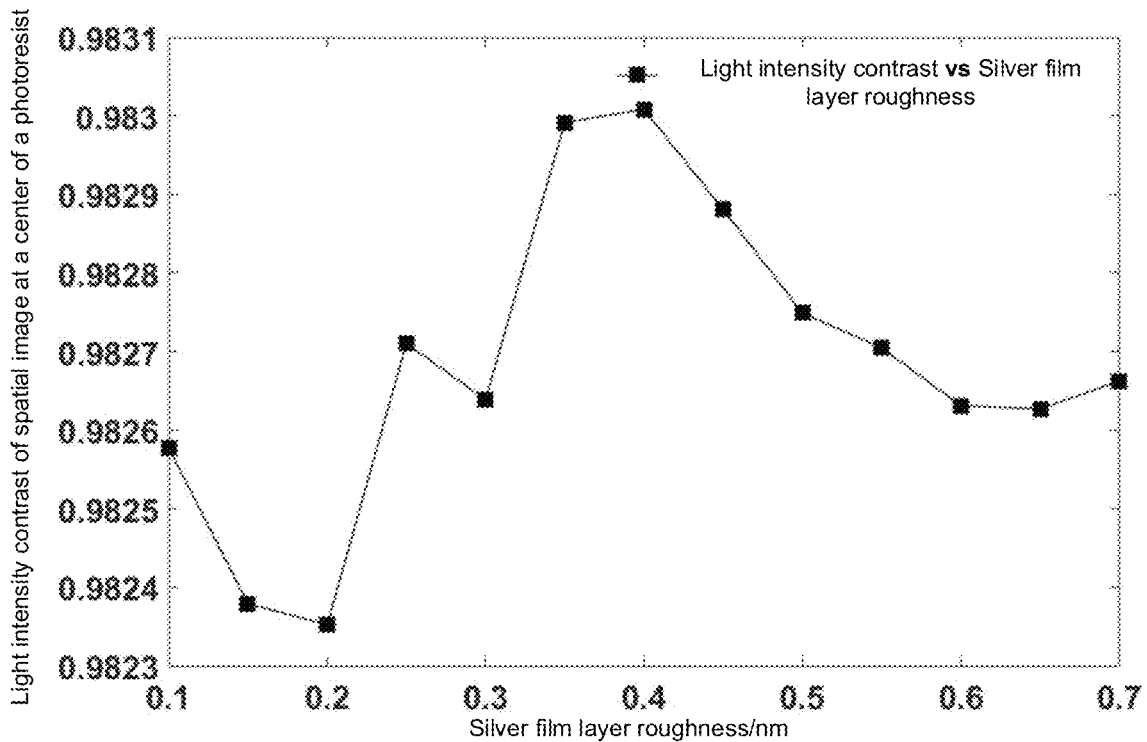
FIG. 9 schematically shows a schematic diagram of a curve between a light intensity contrast in a photoresist and a surface-type roughness of an Ag layer as shown in FIG. 6.

FIG. 9 shows a schematic diagram of a curve between a light intensity contrast in the photoresist of the resonant cavity imaging structure and a surface-type roughness of an Ag layer. As shown in FIG. 9, the surface-type roughness of the upper- and lower-layer Ag of the photoresist varies in a range of 0.1 nm to 0.7 nm, and the light intensity contrast of the spatial image at the center of the photoresist is maintained above 0.98. Therefore, for an imaging structure of Ag—Pr—Ag, the film layer roughness is in a range of 0.7 nm, which has no great influence on the lithography quality, but an overall light intensity contrast of the imaging structure of Ag—Pr—Ag is higher than that of an imaging structure of Pr—Ag in Embodiment 1.

Embodiment 3

Figure 10:
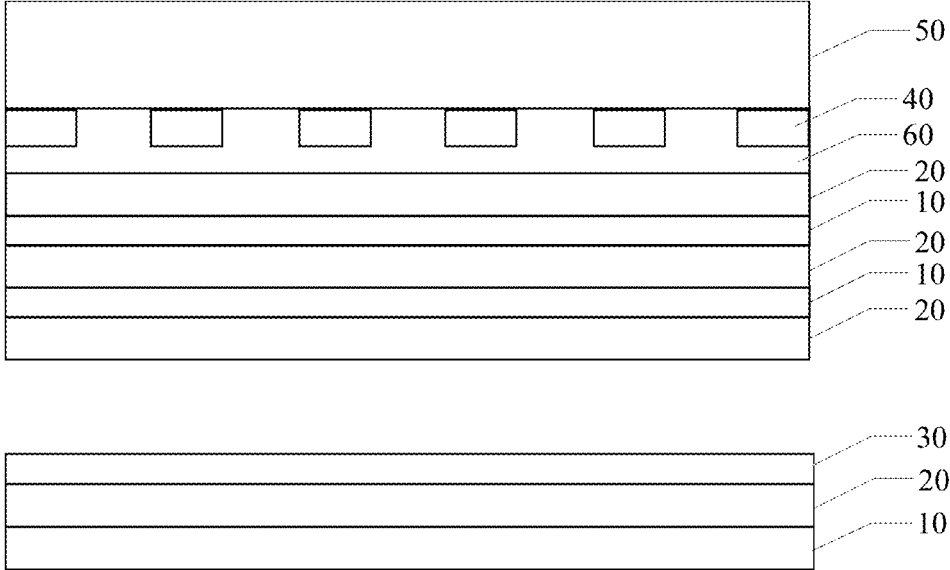
FIG. 10 schematically shows a schematic structural diagram of a metal-dielectric unit according to yet another embodiment of the present disclosure.

The structure of the metal-dielectric unit in this embodiment is illustrated in FIG. 10. The difference between this embodiment and Embodiment 1 is as follows:

In this embodiment, the structure of the metal-dielectric unit is an imaging structure in the form of photoresist-silver based on an Ag—SiO$_2$ multilayer film, as shown in FIG. 10. The Ag—SiO$_2$ multilayer film is composed of alternately arranged Ag layer 20 and silicon dioxide layer 10. Specifically, a titanium dioxide flat layer 60, the Ag layer 20, the silicon dioxide layer 10, the Ag layer silicon 20, the silicon dioxide layer 10 and the Ag layer 20 are sequentially arranged on the chromium strip 40.

A dielectric constant of titanium dioxide is 7.8375-0.2800i. A dielectric constant of a multilayer film Ag is −2.0525-0.73533i, and a dielectric constant of SiO$_2$ is 2.1898-0.008838i. Other parameters thereof are consistent with those in Embodiment 1.

Figure 11:
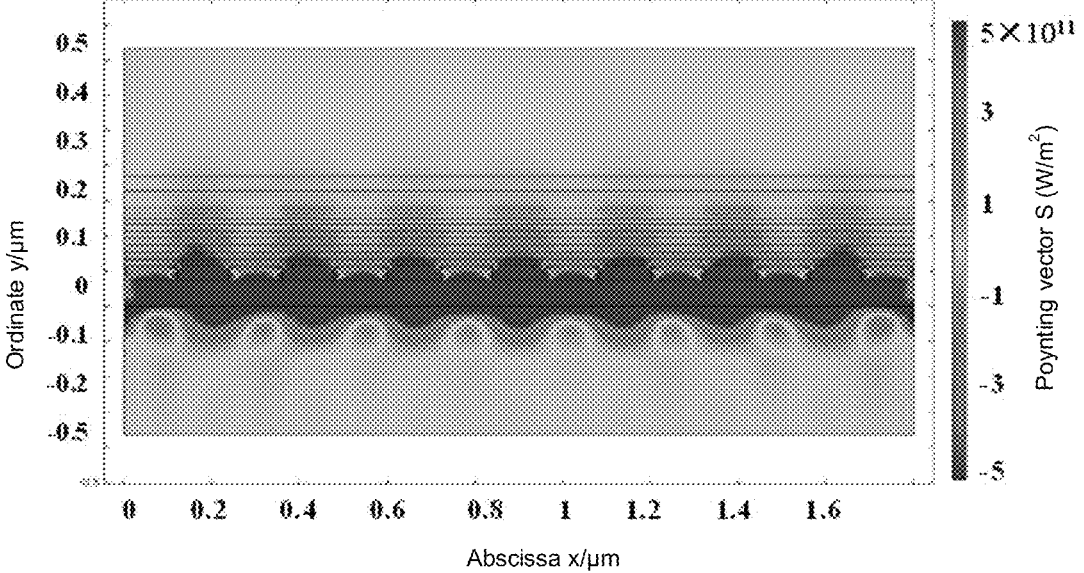
FIG. 11 schematically shows a schematic diagram of a Poynting vector distribution of the metal-dielectric unit shown in FIG. 10.

Similarly, a numerical simulation calculation is performed based on the finite element analysis method in combination with the wave function stray term introduced by the surface roughness of the metal film layer, so as to obtain a Poynting vector distribution in a two-dimensional plane, as shown in FIG. 11. Compared with Embodiment 1, due to a layer-by-layer coupling and superposition effect of a multilayer film on the evanescent wave, the imaging structure in the form of photoresist-silver based on the Ag—SiO$_2$ multilayer film in this embodiment may lead to an enhancement of the electromagnetic field energy in a propagation process compared with Embodiment 1.

Figure 12:
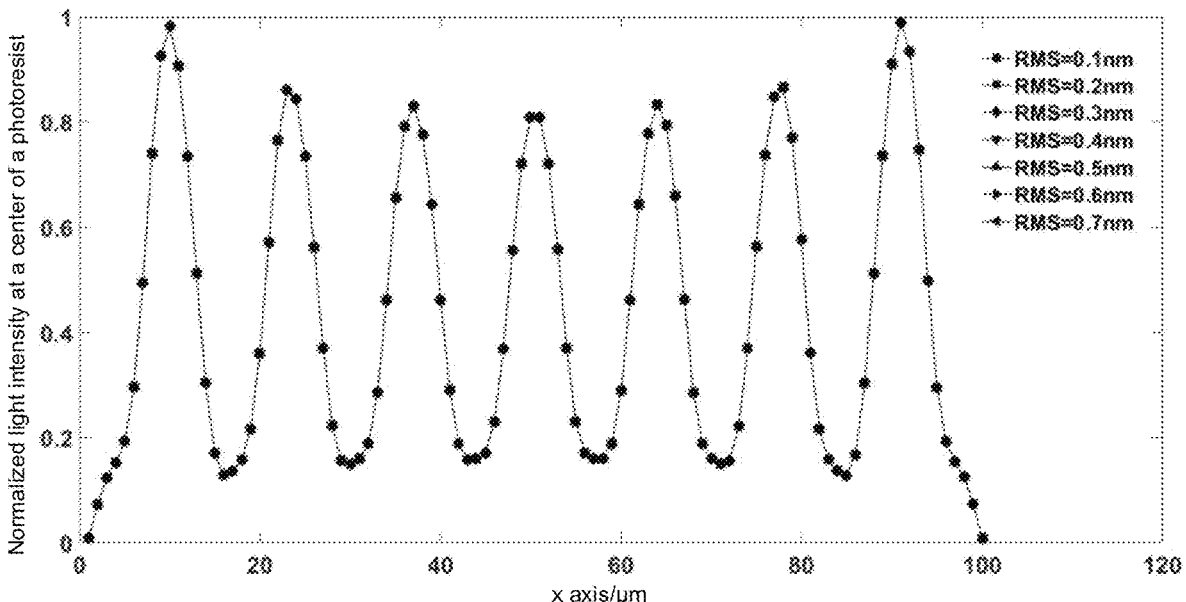
FIG. 12 schematically shows a schematic diagram of a normalized light intensity distribution at a center of a photoresist of the metal-dielectric unit as shown in FIG. 10.

FIG. 12 shows a schematic diagram of a normalized light intensity distribution at a center of a photoresist of the resonant cavity imaging structure. As shown in FIG. 12, for the imaging structure in the form of photoresist-silver of the Ag—SiO$_2$ multilayer film, the roughness RMS of the Ag film layer increases from 0.1 nm to 0.7 nm, and an introduced evanescent wave stray term reaches a portion of the photoresist by layer-by-layer accumulation and coupling of film layers, and does not lead to a change in the light intensity distribution of the spatial image at the center of the photoresist. An accumulation and coupling effect of the film layers may improve a tolerance of the imaging structure of Pr—Ag to the film layer roughness, and reduce an influence of the film layer roughness on the lithography quality.

Figure 13:
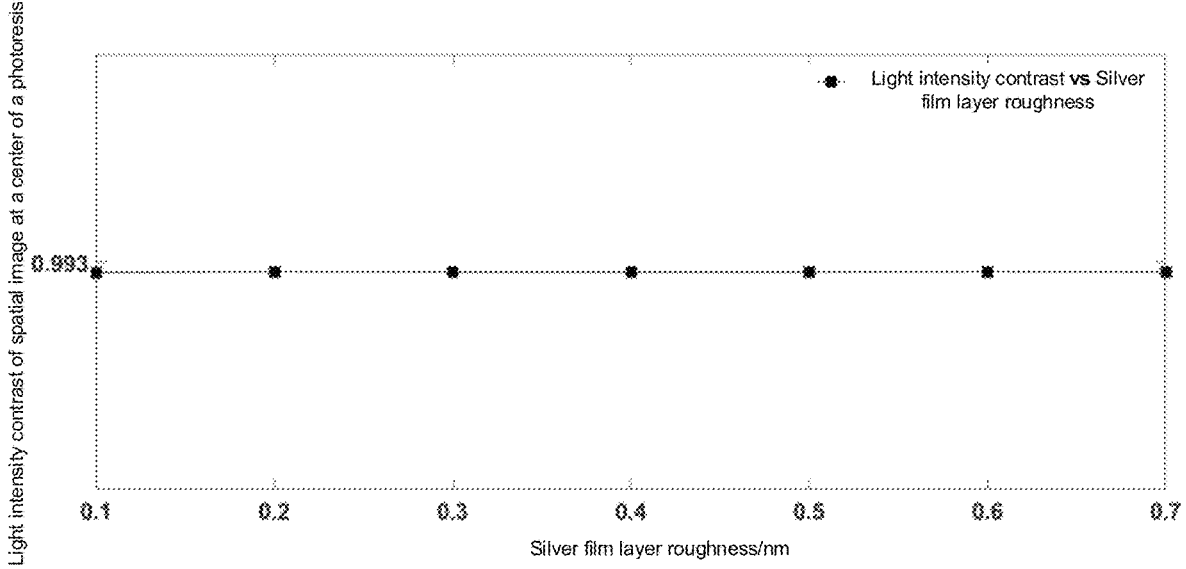
FIG. 13 schematically shows a schematic diagram of a curve between a light intensity contrast and a surface-type roughness of an Ag layer in a photoresist as shown in FIG. 10.

FIG. 13 shows a schematic diagram of a curve between a light intensity contrast and a surface-type roughness of an Ag layer in the photoresist of the resonant cavity imaging structure. As shown in FIG. 13, the film layer roughness increases from 0.1 nm to 0.7 nm, the light intensity contrast of the spatial image at the center of the photoresist is maintained at a level greater than 0.992 and slightly lower than 0.993, and the light intensity contrast does not change. Therefore, for the imaging structure of Pr—Ag, due to a coupling and superposition effect of the evanescent wave in a periodic transmission process of the metal-dielectric unit, the influence of the roughness of the metal film layer on the photoresist spatial image, that is, on the photolithography quality, improves a tolerance to the roughness of the metal film layer.

In the embodiments of the present disclosure, it may be clearly shown in Embodiments 1 and 2 that the surface roughness of the metal film layer has a certain influence on the lithography quality, and the lithography quality of the Ag—Pr—Ag structure is higher than that of the Pr—Ag structure. A metal Ag layer is introduced on an upper surface of the photoresist layer, and Ag—Pr—Ag forms a reflection resonant cavity, which improves the light intensity distribution and a lithography contrast in the photoresist. Since a heavy metal Ag is introduced into upper and lower layers of the lithography, a metal ion cleaning process with a better adaptability is required to effectively clean and detect a lithographic wafer, which solves a heavy metal pollution problem of the imaging structure in a lithography process. In addition, in combination with Embodiment 3, for the mask-air-Pr—Ag structure of Embodiment 1, an introduction of a metal-dielectric multilayer film between the mask and the air may reduce an influence of the film layer roughness on the lithography quality.

It should be noted that the structure of the metal-dielectric unit, the layer thickness of the monolayer film, the material and the like in the above-mentioned embodiments are merely exemplary descriptions, which does not mean that the embodiments of the present disclosure are not applicable to metal-dielectric units of other structures. In addition, the optimization method provided by the present disclosure is not limited to the metal-dielectric unit structure in which the metal film layer is Ag. In other practical application processes, the optimization method may be used to optimize a roughness of other metal layers and dielectric layers.

In an actual lithography process, a metal-dielectric unit structure actually required may be analyzed based on the optimization method provided by the present disclosure, and the lithography quality in the lithography process may be optimized, thereby reducing a line edge roughness of the photoresist pattern.

Figure 14:
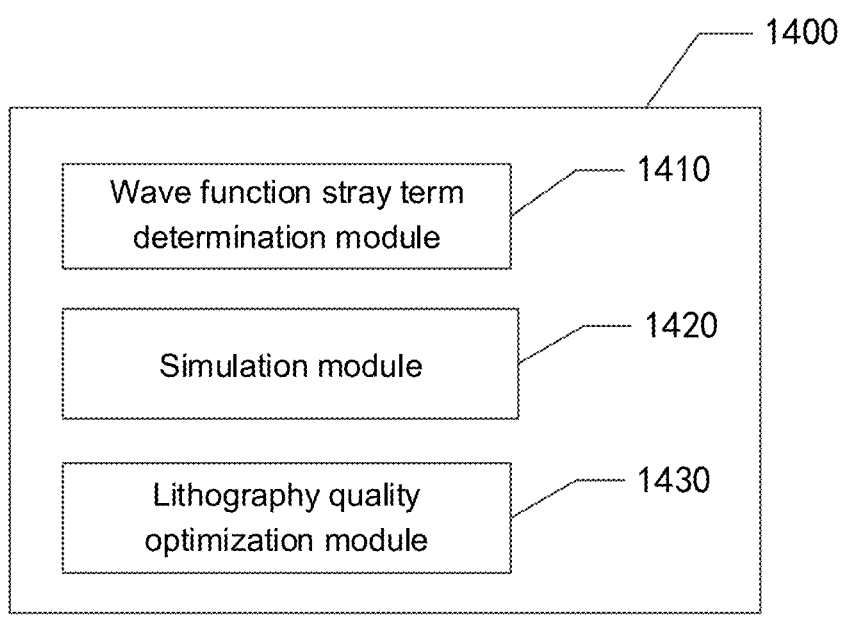
FIG. 14 schematically shows a block diagram of an apparatus for optimizing a lithography quality according to an embodiment of the present disclosure.

FIG. 14 schematically shows a block diagram of an apparatus for optimizing a lithography quality according to an embodiment of the present disclosure.

As shown in FIG. 14, the apparatus 1400 for optimizing a lithography quality includes: a wave function stray term determination module 1410, a simulation module 1420 and a lithography quality optimization module 1430. The apparatus 1400 for optimizing a lithography quality may be used to implement the method for optimizing a lithography quality described with reference to FIG. 1.

The wave function stray term determination module 1410 is configured to determine a wave function stray term introduced by a surface roughness of a metal film layer based on an Eigen matrix method and Bloch theorem. According to the embodiments of the present disclosure, the wave function spurious term determination module 1410 may be used, for example, to perform the step S101 described above with reference to FIG. 1, which will not be repeated here.

The simulation module 1420 is configured to input the wave function stray term into a lithography quality deviation mathematical model for calculation and simulation to obtain an influence analysis curve of a roughness of the metal film layer on the lithography quality, and the influence analysis curve characterizes an influence result of the roughness of the metal film layer on the lithography quality. According to the embodiments of the present disclosure, the simulation module 1420 may be used, for example, to perform the step S102 described above with reference to FIG. 1, which will not be repeated here.

The lithography quality optimization module 1430 is configured to reduce the surface roughness of the metal film layer and/or provide a metal-dielectric multilayer film structure between a mask above a metal-dielectric unit and air according to the influence result, so as to optimize the lithography quality of the metal-dielectric unit. According to the embodiments of the present disclosure, the lithography quality optimization module 1430 may be used, for example, to perform the step S103 described above with reference to FIG. 1, which will not be repeated here.

Any plurality of the modules, sub-modules, units and sub-units, or at least part of functions thereof according to the embodiments of the present disclosure may be implemented in one module. Any one or more of the modules, sub-modules, units, and sub-units according to the embodiments of the present disclosure may be divided into a plurality of modules to be implemented. Any one or more of modules, sub-modules, units and sub-units according to the embodiments of the present disclosure may be partially implemented as a hardware circuit, such as a Field Programmable Gate Array (FPGA), a Programmable Logic Array (PLA), a System-on-Chip, a System-on-Substrate, a System-on-Package, an Application Specific Integrated Circuit (ASIC), or implemented by any other reasonable hardware or firmware that integrates or packages circuits, or may be implemented in any one of three implementation modes of software, hardware and firmware or in an appropriate combination thereof. Alternatively, one or more of the modules, sub-modules, units and sub-units according to embodiments of the present disclosure may be partially implemented as a computer program module which, when executed, may perform a corresponding function.

For example, any plurality of the wave function stray term determination module 1410, the simulation module 1420 and the lithography quality optimization module 1430 may be combined in one module to be implemented, or any one of the modules may be split into a plurality of modules to be implemented. Alternatively, at least part of the functions of one or more of these modules may be combined with at least part of functions of other modules and implemented in one module. According to the embodiments of the present disclosure, at least one of the wave function stray term determination module 1410, the simulation module 1420 and the lithography quality optimization module 1430 may be partially implemented as a hardware circuit, such as a Field Programmable Gate Array (FPGA), a Programmable Logic Array (PLA), a System-on-Chip, a System-on-Substrate, a System-on-Package, an Application Specific Integrated Circuit (ASIC), or implemented by any other reasonable hardware or firmware that integrates or packages circuits, or may be implemented in any one of three implementation modes of software, hardware and firmware or in an appropriate combination thereof. Alternatively, at least one of the wave function stray term determination module 1410, the simulation module 1420 and the lithography quality optimization module 1430 may be partially implemented as a computer program module which, when executed, may perform a corresponding function.

Figure 15:
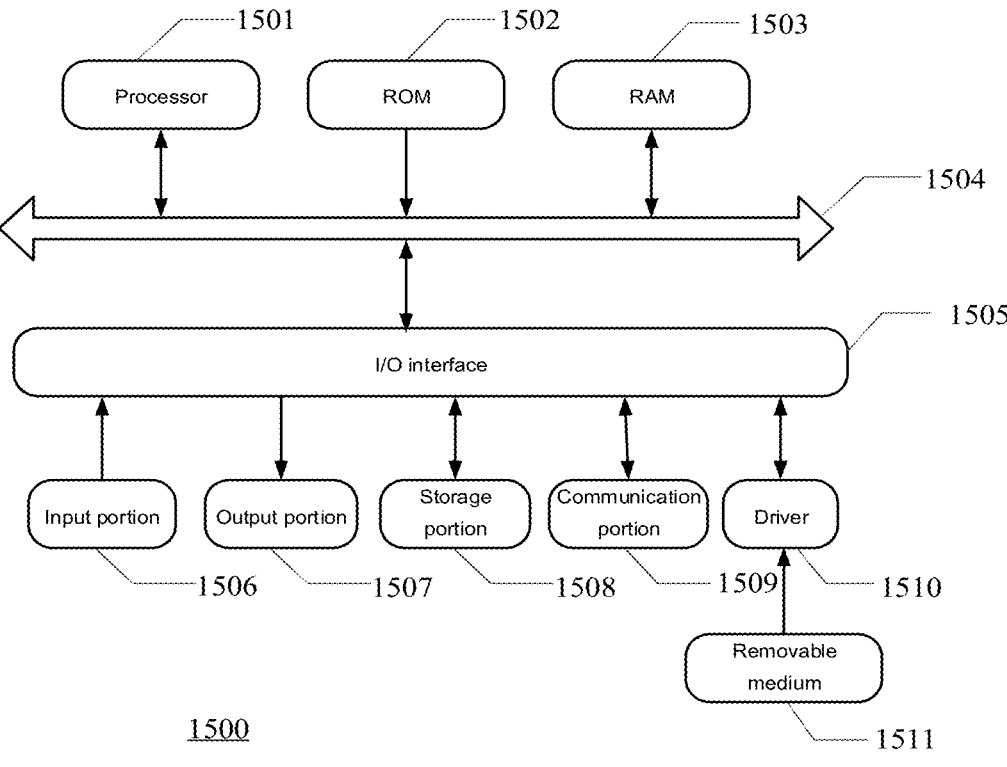
FIG. 15 schematically shows a block diagram of an electronic device suitable for implementing the above-mentioned method according to an embodiment of the present disclosure.

FIG. 15 schematically shows a block diagram of an electronic device suitable for implementing the above-mentioned method according to an embodiment of the present disclosure. The electronic device shown in FIG. 15 is merely an example, and should not impose any limitation on the function and scope of use of the embodiments of the present disclosure.

As shown in FIG. 15, an electronic device 1500 described in this embodiment includes: a processor 1501, which may perform various appropriate actions and processes according to a program stored in a Read Only Memory (ROM) 1502 or a program loaded from a storage section 1508 into a Random Access Memory (RAM) 1503. The processor 1501 may include, for example, a general-purpose microprocessor (e.g., a CPU), an instruction set processor and/or associated chipset, and/or a dedicated-purpose microprocessor (e.g., an Application Specific Integrated Circuit (ASIC)), and the like. The processor 1501 may also include an onboard memory for a caching purpose. The processor 1501 may include a single processing unit or a plurality of processing units for performing different actions of a method flow according to the embodiments of the present disclosure.

In the RAM 1503, various programs and data necessary for an operation of the electronic device 1500 are stored. The processor 1501, the ROM 1502 and the RAM 1503 are connected to each other via a bus 1504. The processor 1501 performs various operations of the method flow according to the embodiments of the present disclosure by executing a program in the ROM 1502 and/or the RAM 1503. Note that the program may also be stored in one or more memories other than the ROM 1502 and the RAM 1503. The processor 1501 may also perform various operations of the method flow according to the embodiments of the present disclosure by executing a program stored in the one or more memories.

According to the embodiments of the present disclosure, the electronic device 1500 may also include an input/output (I/O) interface 1505, where the input/output (I/O) interface 1505 may also be connected to the bus 1504. The electronic device 1500 may also include one or more of the following components connected to the I/O interface 1505: an input portion 1506 containing a keyboard, a mouse, and the like; an output portion 1507 containing components such as a Cathode Ray Tube (CRT), a Liquid Crystal Display (LCD), and the like, and a speaker and the like; a storage portion 1508 containing a hard disk and the like; and a communication portion 1509 containing a network interface card such as a LAN card, a modem, or the like. The communication portion 1509 performs a communication processing via a network such as an Internet. A driver 1510 is also connected to the I/O interface 1505 as needed. A removable medium 1511 such as a magnetic disk, an optical disk, a magneto-optical disk, a semiconductor memory, or the like is installed on the driver 1510 as needed, so that a computer program read therefrom is installed on the storage portion 1508 as needed.

According to the embodiments of the present disclosure, the method flow according to the embodiments of the present disclosure may be implemented as a computer software program. For example, the embodiments of the present disclosure include a computer program product including a computer program carried on a computer-readable storage medium, and the computer program contains a program code for performing the method illustrated in the flowchart. In such an embodiment, the computer program may be downloaded and installed from a network through the communication portion 1509, and/or installed from the removable medium 1511. The computer program, when executed by the processor 1501, performs the above-mentioned functions defined in the system of the embodiments of the present disclosure. According to the embodiments of the present disclosure, the above-mentioned systems, apparatuses, devices, modules, units, and the like may be implemented by a computer program module.

The embodiments of the present disclosure further provide a computer-readable storage medium, which may be contained in a device/apparatus/system described in the above-mentioned embodiments; or may exist alone without being assembled into the device/apparatus/system. The above-mentioned computer-readable storage medium carries one or more programs that, when executed by the one or more programs, implement the method for optimizing a lithography quality according to the embodiments of the present disclosure.

According to the embodiments of the present disclosure, the computer-readable storage medium may be a non-volatile computer-readable storage medium, and may include, for example but is not limited to: a portable computer diskette, a hard disk, a Random Access Memory (RAM), a read-only memory (ROM), an erasable programmable read-only memory (EPROM or a flash memory), a portable compact disk read-only memory (CD-ROM), an optical storage device, a magnetic storage device, or any suitable combination thereof. In the embodiments of the present disclosure, the computer-readable storage medium may be any tangible medium containing or storing a program that may be used by or in conjunction with an instruction execution system, apparatus, or device. For example, according to the embodiments of the present disclosure, the computer-readable storage medium may include the ROM 1502 and/or RAM 1503 and/or one or more memories other than the ROM 1502 and RAM 1503.

The embodiments of the present disclosure also include a computer program product including a computer program, and the computer program contains a program code for performing the method illustrated in the flowchart. When the computer program product runs on a computer system, the program code is used to enable the computer system to implement the method for optimizing a lithography quality provided by the embodiments of the present disclosure.

The computer program, when executed by the processor 601, performs the above-mentioned function defined in the system/apparatus of the embodiments of the present disclosure. According to the embodiments of the present disclosure, the above-mentioned systems, apparatuses, modules, units, and the like may be implemented by a computer program module.

In one embodiment, the computer program may rely on a tangible storage medium such as an optical storage device, a magnetic storage device, and the like. In another embodiment, the computer program may also be transmitted, distributed in a form of a signal over a network medium, and downloaded and installed through the communication portion 1509, and/or installed from the removable medium 1511. The program code contained in the computer program may be transmitted using any suitable network medium, including but not limited to: wireless, wired, etc., or any suitable combination thereof.

In such an embodiment, the computer program may be downloaded and installed from a network through the communication portion 1509, and/or installed from the removable medium 1511. The computer program, when executed by the processor 601, performs the above-mentioned functions defined in the system of the embodiments of the present disclosure. According to the embodiments of the present disclosure, the above-mentioned systems, devices, apparatuses, modules, units and the like may be implemented by a computer program module.

According to the embodiments of the present disclosure, the program code for executing the computer program provided by the embodiments of the present disclosure may be written in any combination of one or more programming languages, and in particular, the computer program may be implemented using a high-level procedural and/or object-oriented programming language, and/or an assembly/machine language. The programming languages include, but are not limited to, languages such as Java, C++, python, "C", or similar programming languages. The program code may execute entirely on a user computing device, partly on a user device, partly on a remote computing device, or entirely on the remote computing device or a server. Where a remote computing device is involved, the remote computing device may be connected to the user computing device through any kind of network including a local area network (LAN) or wide area network (WAN), or may be connected to an external computing device (e.g., connected via an Internet by using an Internet service provider).

The present disclosure provides a method and apparatus for optimizing a lithography quality, an electronic device, a computer-readable storage medium, and a computer program product. The wave function stray term introduced by the surface roughness of the metal film layer is determined by the Eigen matrix method and the Bloch theorem. Combined with the wave function stray term, a numerical simulation is performed, and an influence of the roughness of the metal film layer on the lithography quality is analyzed, so as to improve the lithography quality of the metal-dielectric unit and reduce a line edge roughness of a photoresist pattern.

It should be noted that each functional module in each embodiment of the present disclosure may be integrated into one processing module, or each module may exist physically alone, or two or more modules may be integrated into one module. The above-mentioned integrated modules may be implemented in a form of hardware, and may also be implemented in a form of software function modules. The integrated modules, if implemented in the form of software functional modules and sold or used as independent products, may be stored in a computer-readable storage medium. Based on this understanding, a part of the technical solution of the present disclosure that contributes to the prior art or all or part of the technical solution may be essentially embodied in a form of software products.

A flowchart and block diagrams in the drawings illustrate an architecture, functionality, and operations that may be implemented in systems, methods and computer program products according to various embodiments of the present disclosure. In this regard, each block in the flowchart or block diagrams may represent a module, program segment, or portion of code, and the module, program segment, or portion of code, which may contain one or more executable instructions for implementing specified logical function(s). It should also be noted that, in some alternative implementations, functions noted in blocks may occur out of a order noted in the drawings. For example, two blocks shown in succession may, in fact, be executed substantially concurrently, or the blocks may sometimes be executed in a reverse order, depending upon the functionality involved. It is also be noted that each block of the block diagrams or flowchart, and a combination of the blocks in the block diagrams or flowchart, may be implemented by a specified hardware-based system that performs specified functions or operations, or a combination of a specified hardware and a computer instruction.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Although the present disclosure has been shown and described with reference to the specific exemplary embodiments of the present disclosure, those skilled in the art will appreciate that, without departing from the spirit and scope of the present disclosure as defined by the appended claims and their equivalents, various changes in form and detail have been made in the present disclosure. Therefore, the scope of the present disclosure should not be limited to the above-mentioned embodiments, but should be determined not only by the appended claims, but also by their equivalents.

What is claimed is:

1. A method for optimizing a lithography quality, comprising:

determining a wave function stray term introduced by a surface roughness of a metal film layer based on an Eigen matrix method and Bloch theorem;

inputting the wave function stray term into a lithography quality deviation mathematical model for calculation and simulation to obtain an influence analysis curve of a roughness of the metal film layer on a lithography quality, wherein the influence analysis curve characterizes an influence result of the roughness of the metal film layer on the lithography quality; and reducing the surface roughness of the metal film layer and/or providing a metal-dielectric multilayer film structure between a mask above a metal-dielectric unit and air according to the influence result, so as to optimize the lithography quality of the metal-dielectric unit.

2. The method for optimizing a lithography quality according to claim 1, wherein the determining a wave function stray term introduced by a surface roughness of a metal film layer based on an Eigen matrix method and Bloch theorem comprises:

obtaining an Eigen matrix of a monolayer film in the metal-dielectric unit according to the Eigen matrix method;

obtaining an unit Eigen matrix of the metal-dielectric unit according to the Eigen matrix of the monolayer film; and determining a variation term introduced by a film layer thickness caused by the roughness of the metal film layer based on the Bloch theorem and the unit Eigen matrix, so as to obtain the wave function stray term introduced by the surface roughness of the metal film layer.

3. The method for optimizing a lithography quality according to claim 2, wherein the Eigen matrix $M_n(k_x, t_n)$ of the monolayer film satisfies a relationship of:

$$M_n(k_x, t_n) = \begin{pmatrix} \cos k_{zn} t_n & -\dfrac{ik_0 \varepsilon_n}{k_{zn}} \sin k_{zn} t_n \\ -\dfrac{ik_{zn}}{k_0 \varepsilon_n} \sin k_{zn} t_n & \cos k_{zn} t_n \end{pmatrix}$$

where $k_x$ represents a wave vector of an evanescent wave along an x-axis, $t_n$ represents a layer thickness of the monolayer film, $k_{zn}$ represents a wave vector of an electromagnetic wave along a z-axis, $k_0$ represents a wave vector in a vacuum, co represents a dielectric constant of the vacuum, and $\varepsilon_n$ represents a dielectric constant of the monolayer film.

4. The method for optimizing a lithography quality according to claim 3, wherein the unit Eigen matrix $M_{unit}(k_x, t_n)$ of the metal-dielectric unit satisfies a relationship of:

$$M_{unit}(k_x, t_n) = \begin{pmatrix} \cos(k_{zm} t_n - k_{zd} t_n) & \dfrac{ik_0 \varepsilon_m}{k_{zm}} \sin(k_{zd} t_n - k_{zm} t_n) \\ \dfrac{ik_{zm}}{k_0 \varepsilon_m} \sin(k_{zd} t_n - k_{zm} t_n) & \cos(k_{zm} t_n - k_{zd} t_n) \end{pmatrix}$$

where $t_n = t_m = t_d$, $t_m$ represents a layer thickness of a metal layer, ta represents a layer thickness of a dielectric layer, $k_{zm}$ represents a wave vector of the electromagnetic wave along the z-axis in the metal layer, $k_{zd}$ represents a wave vector of the electromagnetic wave along the z-axis in the dielectric layer, and $\varepsilon_m$ represents a dielectric constant of the metal layer.

5. The method for optimizing a lithography quality according to claim 4, wherein the wave function stray term $\Delta\psi(z')$ introduced by the surface roughness of the metal film layer satisfies a relationship of:

$$\Delta\psi(z') = \exp(-ik_z(t_m + \Delta t + t_d))\psi(z)$$

where $k_z$ represents a wave vector of the evanescent wave along the z-axis, $\Delta\psi(z')$ represents a normalized wave function of a transverse magnetic wave in an x-z plane, $\Delta t$ represents a variation term introduced by the film layer thickness $t_m$ caused by the roughness of the metal film layer, $z'=z+t_m+t_d$, z represents a coordinate of the electromagnetic wave, and z' represents a coordinate of the electromagnetic wave passing through the metal-dielectric unit.

6. The method for optimizing a lithography quality according to claim 1, wherein the inputting the wave function stray term into a lithography quality deviation mathematical model for calculation and simulation to obtain an influence analysis curve of a roughness of the metal film layer on the lithography quality comprises:

inputting the wave function stray term into the lithography quality deviation mathematical model for calculation and simulation to obtain an energy density distribution result of the metal-dielectric unit; and obtaining the influence analysis curve of the roughness of the metal film layer on the lithography quality according to the energy density distribution result.

7. The method for optimizing a lithography quality according to claim 1, further comprising: before the step of determining a wave function stray term introduced by a surface roughness of a metal film layer, testing an upper surface morphology of the metal film layer by using an atomic force microscope;

testing a lower surface topography of the metal film layer by using a template stripping and flipping technology; and obtaining the surface roughness of the metal film layer according to the upper surface topography and the lower surface topography.

8. The method for optimizing a lithography quality according to claim 1, wherein the metal-dielectric unit is composed of at least one metal film layer, and a dielectric layer in the metal-dielectric unit is located between metal film layers.

9. The method for optimizing a lithography quality according to claim 8, wherein the at least one metal film layer is composed of one or more materials selected from Ag, Al, and Au.

10. The method for optimizing a lithography quality according to claim 1, wherein the metal-dielectric multilayer film structure is an Ag—$SiO_2$ multilayer film structure.

11. An apparatus for optimizing a lithography quality, comprising:

a wave function stray term determination module configured to determine a wave function stray term introduced by a surface roughness of a metal film layer based on an Eigen matrix method and Bloch theorem;

a simulation module configured to input the wave function stray term into a lithography quality deviation mathematical model for calculation and simulation to obtain an influence analysis curve of a roughness of the metal film layer on a lithography quality, wherein the influence analysis curve characterizes an influence result of the roughness of the metal film layer on the lithography quality; and a lithography quality optimization module configured to reduce the surface roughness of the metal film layer and/or provide a metal-dielectric multilayer film structure between a mask above a metal-dielectric unit and air according to the influence result, so as to optimize a lithography quality of the metal-dielectric unit.

12. An electronic device comprising: a memory, a processor, and a computer program stored in the memory and running on the processor, wherein the computer program, when executed by the processor, implements the method for optimizing a lithography quality according to claim 1.

13. A computer-readable storage medium having a computer program stored thereon, wherein the computer program, when executed by a processor, implements the method for optimizing a lithography quality according to claim 1.

14. A computer program product comprising a computer program, wherein the computer program, when executed by a processor, implements the method for optimizing a lithography quality according to claim 1.

\* \* \* \* \*